United States Patent Office 3,695,890
Patented Oct. 3, 1972

---

3,695,890
COLLAGEN PULP BEVERAGE TEXTURIZER
Albert T. Miller, Somerville, N.J., assignor to
Devro, Inc.
No Drawing. Filed Nov. 2, 1970, Ser. No. 86,369
Int. Cl. A23l 1/00
U.S. Cl. 99—78                                    17 Claims

ABSTRACT OF THE DISCLOSURE

Synthetic juice pulp is formed from pulp-sized discrete flake-like particles of an edible, cold water insoluble, acid-swellable, regenerated collagen. The synthetic pulp consists of particles of regenerated collagen which differ in their swelling characteristics according to their size or amount of curing or tanning. The synthetic pulp is incorporated into dry beverage powders, beverage concentrates, or into the aqueous beverage itself.

BACKGROUND OF THE INVENTION

This invention relates to synthetic pulps for edible synthetic juices and beverages, which act as a texturizer to produce a pulpy mouth feel and appearance in the beverage and is more particularly concerned with the use of cold water insoluble, acid-swellable, regenerated collagen as such a pulp and with the beverages containing said collagen synthetic pulp and also the processes by which such beverages are made.

Heretofore numerous attempts have been made by the prior art to furnish synthetic beverage powders which are marketed in substantially dry, relatively finely divided form, which when mixed with water shortly before consumption provide a flavored beverage, for example, a fruit-flavored beverage such as the synthetic orange juice currently marketed as "Tang." Examples of prior art patents in this area are: U.S. 2,393,561, which discloses the use of sodium carboxymethyl cellulose in a reconstitutable concentrate of evaporated fruit or vegetable juice; U.S. 3,023,106, which discloses the use of a powdered instant beverage mix which contains an alkali metal salt of carboxymethyl cellulose to create desired mouthfeel and body; U.S. 3,395,021 discloses a fruit beverage powder which achieves a pulpy mouthfeel by incorporation of both a water-soluble gum (such as sodium carrageenate, gum tragacanth, propylene glycol alginate, guar gum) and a water-swellable gum (such as potassium calcium carrageenate, gelatin, agar, calcium alginate, locust bean gum and furcellan); U.S. 3,446,625, which discloses a synthetic juice pulp which utilizes acid-tolerant water-soluble cold water swelling gum (such as algin in combination with amylopectin).

OBJECTS OF THE INVENTION

Formulated fruit-flavored drinks are a rapidly expanding segment of the convenience food field. These products offer price advantages and shelf stability as well as providing higher vitamin contents than their natural counterparts. Present commercial products (which are of the type set forth above as prior art), although excellent in flavor, lack the "mouthfeel" and textural qualities of real fruit juices. It is desirable, therefore, to provide in a synthetic juice a pulp-providing constituent in addition to the water-soluble constituents which impart flavor, color, and nutritional value. Attempts to improve this unsatisfactory textural property in synthetic juice have met wtih only limited success. One of the difficulties of synthetically-produced pulps is its poor hydration from the dry state to form simulated pulp particles when reconstituted with water. Another shortcoming of some prior art synthetic pulps has been their mushy or slimy consistency which develops on storage after reconstitution. Still another disadvantage has been the lack of a random distribution of the synthetic pulp particles throughout the reconstituted beverage product. It is a primary object of the present invention to overcome these drawbacks and disadvantages and to provide a method of producing improved appearance, pulpiness, viscosity, palatability, and hydration in formulated fruit-flavored drinks resembling freshly squeezed fruit juice and also in other types of drinks, such as canned drinks, carbonated soft drinks, vegetable drinks, milk-based drinks, and even heat-processed drinks.

SUMMARY OF THE INVENTION

A synthetic juice pulp or texturizer for fruit-flavored and other beverage products (which have a pH on the acid side) can be made by grinding up edible, cold water insoluble, acid-swellable, regenerated collagen (such as that used to make sausage casings) into pulp-sized flake-like particles.

These regenerated collagen flake-like particles are then added to the dry mix or to the concentrate of those beverages which are to be reconstituted with water or to the beverage itself where it is already in the full aqueous phase. The synthetic pulp hydrates rapidly and swells under the acidic pH conditions of such beverages after they have been reconstituted and also takes up the color of the food dyes used in the beverage. It is preferred to combine different kinds of collagen particles, which differ in their swelling characteristics, so as to obtain a random distribution of synthetic pulp particles in the reconstituted beverage.

DETAILED DESCRIPTION OF THE INVENTION

The regenerated collagen

A very suitable synthetic pulp or texturizer for beverage products (both those which are dry or frozen and require addition of water and those which are canned or bottled) can be made of flake-like particles of an edible, cold water insoluble, acid-swellable, regenerated collagen. The term "regenerated collagen" as used herein means collagen which is not native collagen (i.e. directly from the animal without further treatment) but which has been processed by having been swollen to form a gel or dispersion, which is then used to make the "regenerated collagen." It is this "regenerated collagen" in particulate form which is the synthetic pulp of this invention. These are most easily prepared by grinding any of the edible collagen sausage casings, cold water insoluble collagen films, etc., which are available on the market today, which retain their ability to be acid-swellable at the pH level of most fruit-flavored drinks, which is pH 4.5 or below. The preferred starting collagen materials, which are ground to make the collagen flake-like particles used in the present invention, are the same well-known edible forms of regenerated collagen made by extruding swollen collagen fibrils to form cohered collagen fibrils. Such collagen starting materials and a number of different processes for making them are fully disclosed in the following patents, which show the manufacture of edible collagen sausage casings and films: U.S. 3,123,482; 3,123,653; 3,123,480; 3,123,481; 3,151,990; 3,123,483; 3,346,402; 3,373,046; 3,408,916–8 inclusive; 3,413,129; 3,413,130; 3,425,846; 3,425,847; 3,529,530; 3,535,125; and in the following co-pending patent application, which shows the manufacture of edible collagen film: Albert T. Miller, Ser. No. 10,305 filed Feb. 10, 1970, entitled "Edible Collagen Film."

For purposes of the present invention it does not matter whether the collagen pulp consists of cohered collagen fibrils or fibers so long as it has the necessary swelling characteristics and is edible and cold water insoluble, so while fresh hide or unlimed hide is preferred, limed hide may also be used depending on the way it has been treated and the properties of the resultant formed collagen. Tendon collagen may also be used.

The object of the present invention is achieved through the use of dry translucent regenerated collagen material in flake or particulate form, which is blended with the dry beverage powder or a frozen concentrate or else is blended in a concentrated fruit drink, canned fruit-flavored drink, vegetable drink (such as tomato juice), fruit-flavored bottled soft drink, etc. When the beverage powder or concentrate is dissolved in water, the collagen swells as the result of the acidic pH conditions and absorbs significant quantities of water. The resulting beverage drink has a higher viscosity and more pulp-like mouthfeel and appearance than a similar product without the additive. While the invention will often be described hereinafter as being for a dry powdered beverage which must be reconstituted, it is equally applicable to beverages which were previously reconstituted or which always remained liquid.

The regenerated collagen material can be prepared by any of several methods using either unlimed or acid-treated hide quarter grind, which are fully shown in the foregoing patents and patent applications. Tendon collagen may also be used as the source as may limed hides which have been treated so the resultant collagen material is still acid-swellable and edible.

In accordance with one preferred form of the present invention, a fluid mass of swollen collagen fibrils (of the type used to make edible collagen sausage casings) is extruded in the form of a sheet or tubular body into a coagulating liquid and hardened while in the wet state. Following water washing, the article is air-dried and milled through a screen of 0.5 to 3 mm. dimension resulting in a translucent, flake-like collagen particle. This regenerated collagen material may be colored in the dry state with an edible food coloring and preferably with FD&C insoluble lake dyes, which dyes will be retained by the collagen even after swelling in the beverage product after it has been reconstituted with water (or else swells in the water of the beverages which are already in liquid form).

A preferred step in achieving a natural pulp-like character in the reconstituted beverage or liquid beverage is that of producing a random distribution of particles throughout the beverage and maintaining these particles in suspension during storage after reconstitution. The degree of swelling of the particles is the primary factor in controlling particle distribution. The less swollen particles, having taken up less water, remain in suspension at or near the surface of the juice or other beverage while the highly swollen particles, having absorbed greater quantities of water, are dispersed throughout the beverage or settle to the bottom of the beverage. The size of the flake-like collagen particles is also somewhat influential in obtaining a random distribution in the reconstituted juices or beverages.

The use of a blend of at least two and preferably more kinds of flake-like particles, which kinds of particles differ in their swelling characteristics, is the best way to achieve the desirable random distribution of pulp in the beverage. The swelling characteristics of the regenerated collagen particles can be altered by either chemical tanning or by heat curing in the presence of reducing sugars. Any of the usual vegetable, mineral or synthetic tanning agents may be used including chrome sulfate, chrome alum, aluminum sulfate, formaldehyde, etc. Aluminum sulfate is the preferred tanning agent since it has wide approval among food regulatory agencies. Suitable reducing sugars are those which have a free aldehyde or keto group that is not in glucoside combination with other molecules. Examples of such reducing sugars are erythrose, threose, aribinose, ribose xylose, cyclose, fucose, mannose, glucose (dextrose), galactose, fructose (levulose), etc.

The methods of tanning and using reducing sugars are shown in the foregoing patents and pending applications.

The preparation of a beverage texturizer from ground casing or film was intended originally as a means of utilizing waste materials. As a substantial market develops for this product, more economical production methods could be adopted, which do not require actually producing a casing or film but eliminate these steps while still resulting in a regenerated collagen having the properties required as a texturizer. Two likely methods for producing commercial quantities of this product come quickly to mind. The first involves spray-drying a collagen dispersion to form a flake or particle, and the second entails roll or drum drying a collagen dispersion. Other methods could doubtless also be used.

In Method I, a fairly low solids collagen dispersion or gel (0.5–1% hide solids) is forced under pressure through an atomizing nozzle into a heated chamber or tower such as used in spray drying milk. The dry particulate matter is collected in the bottom of the tower. With proper control in atomizing the slurry, good control of particle size can be had without requiring further grinding or milling.

In Method II, a collagen dispersion of somewhat higher solids (3–6%) is cast onto a heated drum and subsequently dried to form a continuous sheet. This sheet is mechanically disintegrated as it leaves the drum and then further subjected to milling or grinding to achieve proper flake size. This procedure is much like the early drum-drying procedure used in making powdered milk. Due to the higher viscosity of the collagen dispersion, a calendaring or roll coating method would be required for casting the dispersion rather than using the conventional spray application system.

The beverage with which the texturizer is used

The beverages with which the synthetic pulp or texturizer of the present invention are to be used are primarily fruit-flavored drinks, which require a pulp to more closely duplicate the natural material. They are synthetic in the sense that they lack the normal pulp but may otherwise be real; e.g. an orange flavored dry mix drink or an orange juice made from real oranges but which lacks the pulp normally present in the usual freshly squeezed orange juice are both considered "synthetic" for purposes of the present invention. Beverages of this type normally have pH values on the acidic side, below about 4.5, but occasionally (as in the case of milk-based drinks) as high as pH 6.6. The approximate pH values of some illustrative common beverages with which the texturizer of the present invention may be used are as follows:

Fruit juices (natural):
- Orange — 3.6
- Apple — 3.5
- Lemon — 2.4
- Pineapple — 3.6
- Grape — 3.0
- Grapefruit — 3.0

Carbonated beverages:
- Orange — 3.2
- Lemon-lime — 3.1
- Grapefruit — 3.0
- Ginger ale — 2.7
- Cherry — 3.0
- Grape — 3.0

Vegetable juices:
- Tomato — 4.2
- Celery — 6.0
- Mixed (V-8 type) — 4.5
- Carrot — 6.2

Fruit drinks (artificial):
- Orange (Hi-C) — 3.3
- Mixed fruit (Motts AM) — 3.5
- Reconstituted Tang — 3.6
- Reconstituted Start — 3.4

The pH of the beverage has a definite effect on the pulp-like character of the collagen texturizer. At pH values below approximately 4.5, the particles or flakes are in a true swollen state and exhibit a somewhat translucent appearance similar to real fruit pulp. In this pH range, there is a very significant increase in volume of the particle as a result of its swollen nature. This swelling is in the order of a two- to three-fold increase in volume.

When the texturizer is used in beverages having a pH much above 4.5, only minimal "swelling" occurs. The increase in volume here is the result of "osmotic takeup" of water rather than as a result of true swelling where there is an "opening up" of the structure. The particles generally remain opaque and somewhat cloudy. Nevertheless, the resulting improvement in product appearance and mouthfeel is such as to be of some commercial value. The actual rehydration rate and amount of swelling in the low acid pH range will vary depending on the amount of tanning agent and the length of cure time used in the preparation of the particular regenerated collagen texturizer. On the other hand, texturizers prepared from enzyme-treated cold water insoluble film, which are described in some of the foregoing patents and patent applications, exhibit pronounced swelling over the entire acid pH range. Texturizer made from enzyme-treated collagen has a disadvantage, however, in that the pulp particles tend to become soft and somewhat mushy on storage in the hydrated state.

In general, fruit juices, fruit-flavored drinks, and carbonated beverages have a pH less than 3.5. Natural vegetable juices, except tomato juice, are somewhat higher in pH (4.5 to 6.6). Frequently, however, these juices are acidified to reduce the pH and enable lower temperature acid-pack processing (pH 4.2 or less).

Thus although the preferred practice of this invention is with beverages of the first type (pH of less than 4.5), we do not exclude the use of the texturizer from beverages having a pH above 4.5 but below pH 7.0.

Fresh milk generally has a pH of 6.5 to 6.6. Example 11 describes a laboratory trial using texturizer in milk shake to simulate finely ground pieces of fruit pulp.

Details of other conditions

The reconstitution temperature for a powdered drink mix is not a limiting factor in this invention, except when one is using a texturizer prepared from certain of the enzyme-treated edible films. In this case, the pulp material would begin to dissolve as the temperature of the juice or drink is increased above approximately 90° F. In practical use, most dry beverage powders which would have need of this type of texturizer would be prepared using cold water.

In preparation of the fruit-flavored beverage mixes and beverages, a wide range of collagen flake levels can be used depending on the desired viscosity, mouthfeel, and appearance desired. This may also vary depending on the type of juice being simulated. Generally, concentrations of 1 to 5 percent of the dry powdered drink mix is satisfactory.

The method for producing synthetic beverage pulp from regenerated collagen may be more fully understood from the following examples.

Example 1.—Regenerated collagen tubular articles are prepared as shown in U.S. 3,123,482 in the column extrusion system using acid-hide. The extruded tube is coagulated in an aqueous ammonium sulfate bath containing 40 percent ammonium sulfate adjusted to a pH of 7.5 with ammonium hydroxide and then prewashed with 15 percent ammonium sulfate similarly adjusted to pH 7.5 for an equal period of time.

Alum tanning of this extruded casing is accomplished by treatment with an alum solution containing 3 percent alum and 0.68 percent citric acid. The contact time is 18 minutes. This alum tanning solution is maintained at a pH of about 4.55 after the tanning step. The casing then is washed in tap water for 57 minutes using three changes of water. The casing is finally plasticized by passing it through a bath containing 4.52 percent glycerin and 1.0 percent carboxymethyl cellulose. After the casing has been plasticized, it is inflated and dried in a rapid stream of air. The product is then heat cured in a forced draft oven raising the temperature slowly from 35° C. to 80° C. during a 12 hour period. The heat treatment at 80° C. is continued for an additional 12 hours.

To produce the synthetic pulp particles, the above dry tubular articles are milled in a Wiley mill, fitted with a screen having 1.0 mm. openings. The resulting material is translucent and flake-like in appearance.

This material is dry blended with a commercial synthetic orange beverage such as that currently widely sold by General Foods Corporation under the trade name "Tang." The exact composition of Tang is not known, but this product contains sugar, citric acid, sodium citrate, calcium phosphate, gum arabic, sodium carboxymethyl cellulose, hydrogenated vegetable oil, orange flavor, Vitamins A and C, artificial color and a preservative. The synthetic pulp of this invention is used at levels of from 1 to 5 percent of the dry weight of the synthetic juice components. Whey the dry mixture containing synthetic pulp and other juice ingredients is dispersed in water (16.2 to 17.0 grams per ½ cup of water), the soluble ingredients immediately dissolve and the synthetic pulp particles quickly hydrate and swell in the acidic pH conditions to produce a beverage having the natural appearance, texture and mouthfeel practically identical to that of fresh orange juice containing natural pulp. The food dyes used in the synthetic juice are taken up by the synthetic collagen pulp so that the pulp particles acquire a natural color.

Example II.—Example I was repeated except that limed hide was used instead of acid-treated hide with similar good results being obtained.

Example III.—Regenerated collagen tubular articles are prepared as in the washed ammonia blown system shown in U.S. Pat. 3,535,125, previously referred to using unlimed hide. The extruded tube is coagulated in a gaseous ammonia atmosphere and water washed prior to treatment in a plasticizer bath containing 3.7 percent glycerol, 0.33 percent carboxymethyl cellulose and 0.02 percent dextrose. The dwell time in this bath is 12 minutes. The tubular material is inflated and dried in a rapid stream of air and then heat cured in a forced draft oven raising the temperature slowly from 35° C. to 80° C. during an 8-hour period. The heat treatment at 80° C. is continued for an additional 16 hours. In producing the synthetic pulp particles, the dry tubular articles are milled in a Wiley mill fitted with a screen having 1.0 mm. openings. The resulting material is translucent and flake-like in appearance and hydrates rapidly in water to form a stable natural appearing synthetic pulp.

Example IV.—The procedure of Example I was followed except that three separate fractions of dry flake-like collagen were obtained by milling in a Wiley mill fitted with an 0.5 mm. screen, a 1.0 mm. screen and a 2.0 mm. screen. The resulting fractions were blended in the dry state in a ratio of 3 parts of material obtained through a 1.0 mm. screen, 1 part of material obtained through a 2.0 mm. screen and 1 part of material obtained through a 0.5 mm. screen. The blended pulp particles were mixed with a dry synthetic drink product at a level of 2 percent of the dry weight of synthetic juice components. When the dry mixture is dispersed in water, the soluble juice ingredients immediately dissolve and the synthetic pulp particles quickly hydrate and swell in the acidic pH conditions. The larger particles absorb greater quantities of water and settle to the bottom while the finer particles remain suspended in the juice or float on the surface. Thus, a more natural distribution of the particles occurs, resulting in a beverage having a more natural appearance, texture, and mouthfeel.

Example V.—The procedure of Example III was followed except that separate batches of the dry tubular material was heat cured in a forced draft oven at three different temperatures resulting in three different degrees of heat cure in the final synthetic pulp material. Batch No. 1 was cured at a temperature of 75° C. for 3 hours following an initial slow rise from 35° C. during a 12-hour period. Batch No. 2 was cured at 85° C. for 3 hours following an initial slow rise from 35° C. during a 12-hour period. Batch No. 3 was cured at 90° C. for 12 hours following an initial slow rise from 35° C. during an initial 12-hour period. These batches were milled separately in a Wiley mill fitted with a screen having 1.0 mm. openings. The resulting particles were blended in the dry state in a ratio of 2 parts of material cured at 85° C., 1 part of material cured at 90° C., and 1 part of material cured at 75° C. The blended pulp particles were mixed with a dry synthetic drink product at a level of 2 percent of the dry weight of synthetic juice components. When the dry mixture is dispersed in water, the soluble juice ingredients immediately dissolve and the synthetic pulp particles quickly hydrate and swell somewhat less in the acidic pH conditions. The more highly cured collagen particles swell less in the acidic pH conditions, absorbing less water and remaining at or near the surface of the juice while the less cured particles swell to a greater extent and distribute themselves throughout the reconstituted beverage product. Thus, a more natural distribution of the particles occurs, resulting in a beverage having a more natural appearance, texture, and mouthfeel.

Example VI.—An enzyme-treated collagen dispersion was prepared as described in the copending application of Albert T. Miller S.N. 10,305, filed Feb. 10, 1970, entitled "Edible Collagen Film," and was extruded onto a moving belt and dried with moving air currents at temperatures not in excess of 160° F. to produce a continuous sheet of dry film. The dry film was milled in a Wiley mill fitted with a screen having 1.0 mm. openings. The resulting pulp-like particles formed were translucent in appearance and readily hydrated when dispersed in water. Since the collagen has become more soluble during the enzyme treatment, this material readily "swells" in solutions having a pH above 4.5. Thus, products of this example are ideally suited to use in beverage products having relatively mild acid conditions.

Example VII.—The ground collagen flake materials of the foregoing examples are also useful as texturizer for heat-processed canned or bottled fruit flavored beverages which lack the body and pulpy character of real fruit juices. To be suitable for use in these new applications, the pulp additive must be able to withstand the high temperature pasteurization treatment given the product. This has been made possible by treatment of the collagen with alum or dextrose followed by heat curing to effect tanning and resulting heat resistance to the particle. Dextrose or alum tanned production casing (such as shown in Examples 1 and 3) has been found to be suitable for this application and was used as follows.

A mixture of the flaked collagen particles was prepared by grinding casing in a Wiley mill fitted with screen sizes of from 0.5 mm. to 2.0 mm. The various mesh size particles were blended together to yield a more natural appearing pulp-like material. The texturizer was added to "Hi-C" canned orange drink product and "No-Cal" bottle low calorie orange flavored carbonated soda water beverage at levels of 0.3 to 0.35 percent. The texturized drinks were heat-processed at 75° C. and then immediately cooled to 25° C. The swollen particles retained their pulp-like appearance and significantly improved the textural quality of the beverage. Improved particle suspension was achieved with the addition of 0.1 percent Methocel in the juice formulation.

Example VIII.—A collagen dispersion (gel) was prepared to contain 3.55 percent hide solids, 1.18 percent lactic acid and 0.71 percent dextrose. In preparing this dispersion, 30 g. of dry hide solids was weighed into a 1000 ml. beaker and brought up to 300 g. total with water. This mixture was passed through a Mikro-cut grinder and followed with 100 ml. of water. This 430 g. slurry was passed through the Mikro-cut a second time and again followed with 100 ml. of water. The slurry was brought up to 583 g. total with water.

A second mixture was prepared by weighing 233 g. of water into a 400 ml. beaker and adding 11 g. of 88 percent lactic acid and 6 g. of dextrose. This mixture was thoroughly blended and then mixed with the 583 g. of Mikro-cut hide slurry. The gel was aged for 24 hours before being homogenized and deaerated. A second homogenization was performed 24 hours after the first.

The collagen dispersion (gel) was cast on a high-release surface using a Gardner Knife and air-dried at room temperature. After drying, the sample was removed from the casting surface and heat cured in an oven at 90° C. for 36 hours. The dry cured film was ground in a Wiley mill fitted with a 10 mm. screen and used in preparing a texturized beverage.

In the preparation of an improved fruit drink product, the ground pulp-like material was added to a commercial canned orange drink product marketed by the Coca-Cola Company under the brand name "Hi-C." Hi-C contains water, sugar, concentrated orange juice, corn syrup, orange oil, fumaric acid, citric acid, vitamin C, and U.S. certified color. The texturizer was used at a level of 0.3 percent of the total juice weight. The collagen pulp-like flakes immediately hydrated and swelled in the acidic pH conditions of the juice.

To demonstrate the product's suitability for canned, heat-processed drinks, the beverage containing the texturizer was given a simulated "flash pasteurization" treatment typical of commercial high-acid fruit drinks. The drink was rapidly heated under agitation in a glass beaker to 90° C., held at this temperature for approximately 15 seconds and immediately cooled to 25° C. The swollen collagen particles retained their pulp-like appearance and significantly improved the textural quality of the beverage product. This pulp-like character and appearance of the improved beverage was retained over extended periods of storage at room temperature.

Example IX.—Standard Devro 140-D casing was cured at 90° C. for 36 hours and ground in a Wiley mill fitted with a 1 mm. screen size. This ground collagen pulp-like material was used in preparing an improved fruit flavored beverage product. The texturizer was added at a level of 0.35 percent (total beverage weight) to a commercial bottled citrus flavored beverage marketed by Kirsch Beverages under the brand name of "NO-CAL" citrus. The product contains carbonated water, amino acetic acid, artificial color, flavor, saccharin and benzoate of soda.

In demonstrating the heat resistance of the texturizer for use in this application, samples of the carbonated beverage were exposed to atmospheric pressure for several hours to reduce its carbonation, blended with the collagen pulp and heat processed at 90° C. for 15 seconds. The samples were immediately cooled to 25° C. and recarbonated in their original containers. The collagen pulp remained suspended in the beverage after processing. An improved product appearance and textural quality resulted.

Example X.—The product was prepared exactly as in Example VIII, except that 0.1 percent Methocel HG (Dow, hydroxypropyl methylcellulose) was added to the drink along with the collagen texturizer. The resulting beverage product had an improved mouthfeel and appearance as in Example I. In addition, the cellulose gum resulted in improved suspension of the collagen pulp in the beverage on storage.

Example XI.—This example is intended to demonstrate the usefulness of a collagen beverage texturizer in preparing improved milk-based beverage products, more specifically an improved fruit-flavored milk shake beverage. Several commercial products of this type are presently being marketed in a dry powdered form. The consumer adds water to the powdered mix (containing dry milk powder, sugar, malt, flavorings, and thickener), seals the lid and shakes. An instant dairy-type milk shake results. This product, however, lacks the real fruit character of the intended "natural" product, which is prepared with actual fruit purees (pineapple, strawberry, etc.).

The addition of from 1 to 5 percent synthetic pulp (based on total solids in the powdered mix) results in a reconstituted drink having a more natural pulp-like character. In this example, the collagen texturizer used was prepared from edible film as described in Example II of copending patent application Ser. No. 10,305 referred to above. The material was finely ground using a 0.5 mm. screen in the Wiley mill. The commercial beverage product used as the base material was marketed under the brand name "Great Shake" (General Foods).

Example XII.—While hide is the most likely source of the regenerated collagen pulp, other sources could be used if desired.

A collagen dispersion was prepared from bovine deep flexor tendon similar to that described in Example I of Ethicon British Patent 1,095,552 of the type used to make collagen sutures. The gel was cast on Mylar in three successive steps, with air drying between each casting layer. (The solids content of the gel was so low that a sufficient dry film thickness could not be obtained with one casting.) The resulting dry laminate film was ground in a Wiley mill to produce two separate flake sizes. One batch was passed through a 1 mm. screen, the second batch through a 2 mm. screen. Equal parts of the ground fractions were blended together and used in preparing an improved texturized orange drink using a commercial powdered mix sold by General Foods Corporation under the brand name of "Start" Instant Breakfast Drink, which contains sugar, citric acid, gum arabic, natural orange flavor, cellulose gum, sodium citrate, calcium phosphate, hydrogenated vegetable oil, vitamin C, artificial flavors, sodium carrageenin, vitamin A, artificial color and a preservative. The resulting product had a more natural appearance and texture similar to a real fruit juice product. The swollen particles exhibited a translucent, pulpy character as a result of the acidic pH condition of the drink (pH 3.4).

I claim:

1. In a composition used to make a synthetic beverage of the type which is normally drunk cold and which has an acidic pH, the improvement of including therein together with the ingredients of said synthetic beverage, a synthetic juice pulp consisting of pulp-sized discrete flake-like particles of an edible, cold water insoluble, acid-swellable, regenerated collagen.

2. The composition of claim 1 wherein the regenerated collagen used is ground collagen sausage casings.

3. The composition of claim 1 wherein the regenerated collagen used is ground collagen film.

4. The composition of claim 1 wherein the regenerated collagen used is an extruded form of collagen containing cohered hide collagen fibrils.

5. The composition of claim 1 which is in the form of a concentrate to be reconstituted with water before use.

6. The composition of claim 5 which is in the form of a dry beverage powder which is to be reconstituted with water before use.

7. The composition of claim 5 which is in the form of a frozen beverage concentrate.

8. The composition of claim 1 which is in the form of a liquid product ready for use without further addition of liquid.

9. The composition of claim 8 wherein the composition is a carbonated beverage.

10. The composition of claim 1 wherein the pulp contains edible food coloring.

11. The composition of claim 1 which has a pH below 4.5 when fully reconstituted in final liquid form prior to being drunk.

12. A synthetic juice pulp which will produce a random distribution of said pulp throughout the acidic beverage in which it is incorporated consisting of a blend of at least two kinds of pulp-sized discrete flake-like particles of an edible, cold water insoluble, acid-swellable, regenerated collagen wherein each of said kinds of particles differ in their swelling characteristics.

13. The synthetic juice pulp of claim 12 wherein the kinds of collagen particles differ only in size.

14. The synthetic juice pulp of claim 12 wherein the kinds of collagen particles differ according to the amount of curing or tanning received during processing.

15. The process of improving the mouthfeel and texture of a synthetic beverage of the type which is to be drunk cold and which has a pH below 7.0 which comprises adding thereto a synthetic juice pulp consisting of pulp-sized discrete flake-like particles of an edible, cold water insoluble, acid-swellable, regenerated collagen.

16. The process of claim 15 wherein the synthetic pulp is formed of collagen which has been cured or tanned and which provides improved stability of the pulp during subsequent heat processing of the beverage.

17. The process of claim 15 wherein the synthetic pulp is prepared from enzyme-treated collagen and is used in beverages having a pH above 4.5.

References Cited
UNITED STATES PATENTS

| | | | |
|---|---|---|---|
| 3,446,625 | 5/1969 | Blethen | 99—105 |
| 3,425,846 | 2/1969 | Talty | 99—176 |
| 3,413,129 | 11/1968 | Lieberman | 99—176 |
| 3,395,021 | 7/1968 | Glicksman et al. | 99—78 |
| 3,023,106 | 2/1962 | Common | 99—78 |
| 3,114,641 | 12/1963 | Sperti et al. | 99—105 |

OTHER REFERENCES

Sinclair: The Orange, 1965, pp. 231, 238–241.
Meyer: Food Chemistry, 1965, pp. 174–178.

MORRIS O. WOLK, Primary Examiner
S. B. DAVIS, Assistant Examiner

U.S. Cl. X.R.
99—18, 28, 79, 105